United States Patent
Manabe

(10) Patent No.: US 7,368,854 B2
(45) Date of Patent: May 6, 2008

(54) ACTUATOR

(75) Inventor: Mitsuo Manabe, Saitama (JP)

(73) Assignee: Fujinon Corporation, Saitama (JP)

( * ) Notice: Subject to any disclaimer, the term of this patent is extended or adjusted under 35 U.S.C. 154(b) by 40 days.

(21) Appl. No.: 11/528,455

(22) Filed: Sep. 28, 2006

(65) Prior Publication Data

US 2007/0075609 A1   Apr. 5, 2007

(30) Foreign Application Priority Data

Sep. 30, 2005   (JP) .............................. P2005-288633

(51) Int. Cl.
*H02N 2/00* (2006.01)

(52) U.S. Cl. .............. 310/323.17; 310/12; 310/323.01; 310/326; 310/328

(58) Field of Classification Search .............................. 310/323.01–323.05, 323.09, 323.17, 326, 310/328, 12
See application file for complete search history.

(56) References Cited

U.S. PATENT DOCUMENTS 5,847,488 A * 12/1998 Yoshida et al. ............. 310/328
6,188,161 B1 * 2/2001 Yoshida et al. ............. 310/328
6,611,080 B2 * 8/2003 Ngol et al. ............. 310/323.02
2002/0030422 A1   3/2002 Hata
2003/0168940 A1   9/2003 Kurita et al.
2004/0012304 A1   1/2004 Yoshida et al.
2007/0114888 A1 * 5/2007 Tokumiya .................... 310/328

FOREIGN PATENT DOCUMENTS

EP         1708287 A2    10/2006
JP       55046682 A  *    4/1980
JP     EP-1708287 A2 *  10/2006

* cited by examiner

*Primary Examiner*—Thomas M. Dougherty
(74) *Attorney, Agent, or Firm*—Birch, Stewart, Kolasch & Birch, LLP

(57) ABSTRACT

An actuator comprises: an electro-mechanical conversion element; a driving frictional member mounted onto one side in an extension/contraction direction of the electro-mechanical conversion element, the driving frictional member being frictionally engaged with a driven member; and a weight member mounted onto the other side in the extension/contraction direction of the electro-mechanical conversion element, wherein at least a part of the weight member is disposed at the one side from an end face of the other side of the electro-mechanical conversion element.

3 Claims, 4 Drawing Sheets

ACTUATOR

BACKGROUND OF THE INVENTION

1. Field of the Invention

The present invention relates to an actuator, and in particular relates to an actuator for driving a lens of a digital camera and a mobile telephone with a camera feature.

2. Description of the Related Art

An actuator employing a piezoelectric element has been known as a driving device for a lens of a digital camera. For example, an actuator according to JP-A-2002-142470 is composed of a piezoelectric element, a driving member, and a pedestal base. A driving member is affixed to the end face at one side of the extension/contraction direction of the piezoelectric element, and a driven member is frictionally engaged with the driving member. Also, the pedestal base is affixed to the end face at the other side of the extension/contraction direction. The pedestal base has a function of a weight as an inertia body. Pulse-shaped voltage is applied to the piezoelectric element in such a construction, and movement of the piezoelectric element in the extension direction and the contraction direction is transmitted to the driving member by an inertia action of the pedestal base. Where the piezoelectric element is gradually deformed, the driven member moves along with the driving member, and where the piezoelectric element is rapidly deformed, the driven member remains at the same position by the inertia of the mass thereof. Therefore, by repeating application of pulse-shaped voltage, it is possible to cause the driven member to intermittently move at a minute pitch.

The thus composed actuator generates a problem of resonating among the pedestal base, the piezoelectric element, and the driving member. Further, the actuator according to JP-A-2002-142470 is resiliently supported on the main body by adhering the pedestal base to the main body with a rubber-based adhesive agent so that no influence due to resonance is given thereto when being mounted onto the main body. However, with such a drive system, it becomes very difficult to control the unevenness among the pedestal base, the piezoelectric element and the driving member.

If such resonance is utilized, there is an advantage by which the amount of movement of the driving member is increased. For example, Japanese Patent No. 3171187 describes an actuator utilizing the resonance. According to the actuator, by applying pulse-shaped voltage to displacement of the piezoelectric element when resonating, the amount of displacement of the driven member is increased.

However, since the actuator according to JP-A-2002-142470 or Japanese Patent No. 3171187 has a piezoelectric element, a driving member and a pedestal base (or a supporting member) disposed in line in the driving direction, the size thereof in the driving direction is increased, and where a particularly large pedestal base is used, there is a problem that the actuator becomes large. An actuator that can be downsized is demanded.

Further, since the actuator according to JP-A-2002-142470 or Japanese Patent No. 3171187 utilizes a resonant state generated inside the actuator composed of a piezoelectric element, a driving member and a pedestal base, there arises a problem that the driving member is adversely influenced by resonance, and the driving member is thus displaced in directions other than the extension/contraction direction of the piezoelectric element. For example, as depicted in FIG. 7A and FIG. 7B, there arises a problem that the driving member 2 is displaced in directions other than the extension/contraction direction upon receiving influence of resonance. Therefore, a driving force based on extension and contraction of the piezoelectric element 1 is not accurately transmitted to the driven member 3, wherein it becomes difficult to accurately cause the driven member 3 to move in the extension/contraction direction of the piezoelectric element 1. In particular, if the pedestal base (weight member) is made large to increase the thrust of the driven member 3, resonance is liable to occur, wherein an actuator in which resonance is hardly brought about is demanded.

SUMMARY OF THE INVENTION

The present invention has been made in view of these circumstances, and an object thereof is to provide an actuator capable of securely obtaining a sufficient thrust of the driven member and capable of being downsized in the driving direction.

In order to achieve the object, an actuator of a first aspect of the invention comprises: an electromechanical conversion element; a driving frictional member mounted onto one side in an extension/contraction direction of the electromechanical conversion element, the driving frictional member being frictionally engaged with a driven member; and a weight member mounted onto the other side in the extension/contraction direction of the electromechanical conversion element, wherein at least a part of the weight member is disposed at the one side from an end face of the other side of the electro-mechanical conversion element.

According to the first aspect of the invention, since at least a part of the weight member is disposed at the one side from the end face of the other side of the electromechanical conversion element, it is possible to downsize the actuator in the driving direction (that is, in the extension/contraction direction of the electromechanical conversion element).

In addition, according to the first aspect of the invention, since the weight member can be made large without making the actuator large in the driving direction, it is possible to secure a sufficient thrust of the driven member.

A second aspect of the invention provides the actuator according to the first aspect of the invention, further comprises a connecting member mounted onto the end face of the other side of the electromechanical conversion element, wherein the weight member is mounted onto the connecting member.

According to the second aspect of the invention, since the weight member is mounted onto the end face at the other side of the electro-mechanical conversion element via the connecting member, the degree of freedom for disposing the weight member is increased, wherein it is possible to further downsize the actuator.

A third aspect of the invention provides the actuator according to the first or second aspect of the invention, wherein the weight member is formed to be cylindrical, and at least a part of the electro-mechanical conversion element is disposed inside the weight member.

According to the third aspect of the invention, since the weight member is formed to be cylindrical, it is possible to further downsize the actuator.

DETAILED DESCRIPTION OF THE INVENTION

Figure 1:
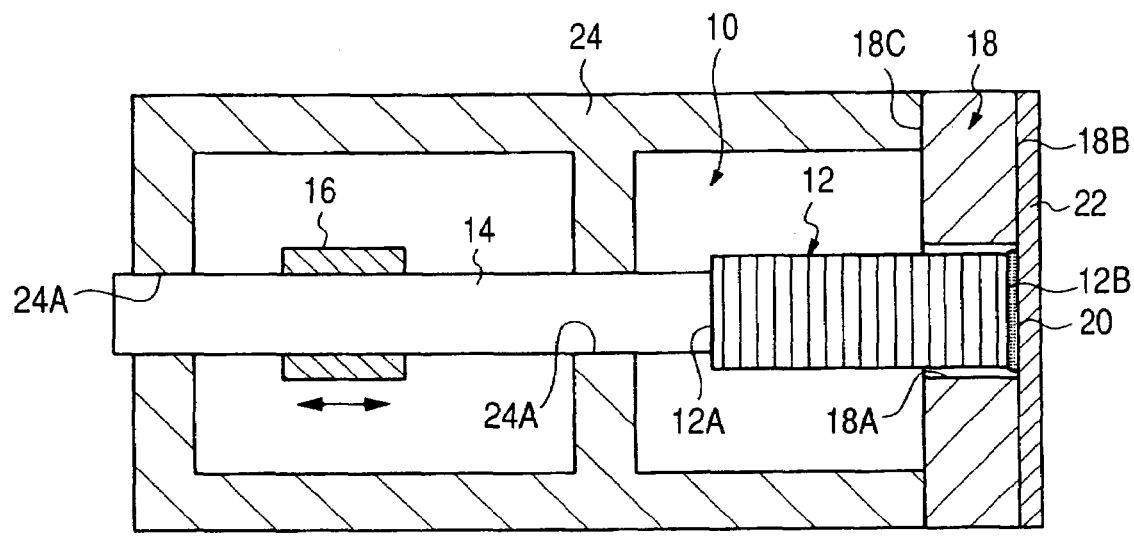
FIG. 1 is a sectional view showing an embodiment of an actuator according to the present invention.

Hereinafter, a detailed description is given of a preferred embodiment of an actuator according to the present invention with reference to the accompanying drawings. FIG. 1 is a configurational view depicting an actuator according to the present invention.

As depicted in FIG. 1, the actuator 10 is mainly composed of a piezoelectric element (corresponding to an electromechanical conversion element) 12, a driving shaft (corresponding to a driving frictional member) 14, a driven member 16 and a weight member 18.

The piezoelectric element 12 is laminated in the direction of the arrow and is formed to be like a rectangular parallelepiped. The piezoelectric element 12 is deformed (is caused to extend and contract) in the lamination direction by applying voltage thereto. Therefore, the piezoelectric element 12 is devised so that the end faces 12A and 12B in its longitudinal direction are displaced.

The base end of the driving shaft 14 is affixed to one end face 12A of the end faces 12A and 12B of the piezoelectric element 12. The driving shaft 14 is formed to be, for example, columnar, and the axis is disposed in the directions of the arrow (that is, in the extension/contraction direction of the piezoelectric element) A graphite crystal composite in which graphite crystal is firmly compounded), for example, carbon graphite is employed as the material of the driving shaft 14. In addition, the driving shaft 14 is not limited to a columnar shape. It may be a square rod.

The driven member 16 is a member connected to a lens frame (not shown), and is engaged with the driving shaft 14 with a predetermined frictional force. Further, the driven member 16 is slidably supported along the driving shaft 14. The frictional force between the driven member 16 and the driving shaft 14 is set so that, when a gently fluctuating voltage is applied to the piezoelectric element 12, the static frictional force is made greater than the driving force, and when a radically fluctuating voltage is applied to the piezoelectric element 12, the static frictional force is made smaller than the driving force.

The weight member 18 is formed to be rectangularly tubular, wherein a rectangular hole 18 that is greater than the section of the piezoelectric element 12 is formed. In a state that the weight member 18 is inserted into the hole 18, the face 18B at the base end side of the weight member 18 is affixed to the plate-shaped connecting member 22 with an adhesive agent, and the connecting member 22 is affixed to the end face 12B of the piezoelectric element 12 with a resilient adhesive agent 20. Accordingly, the weight member 18 is mounted onto the end face 12B of the piezoelectric element 12 via the connecting member 22, and the weight member 18 is disposed at the end face 12A side from the end face 12B of the piezoelectric element 12.

The weight member 18 prevents the end face 12B from being displaced greater than the end face 12A by applying a load to the end face 12B of the piezoelectric element 12. It is preferable that the weight of the weight member 18 is greater than that of the driving shaft 14. For example, where the weight of the driving shaft 14 is 8 mg, and the weight of the piezoelectric element 12 is 32 mg, the weight member 18 of 32 mg is used.

Also, the weight member 18 is formed of a soft material. A material whose Young's modulus is smaller than that of the piezoelectric element 12 and the driving shaft 14 is used as the material of the weight member 18. It is preferable that the Young's modulus of the weight member 18 is 1 Gpa or less, and further preferably, the Young's modulus is 300 Mpa or less. Such a weight member 18 is formed by blending a resilient body such as rubber with metal powder having a high specific gravity. For example, the weight member 18 is produced by blending urethane rubber or urethane resin with tungsten powder. It is preferable that the specific gravity of the weight member 18 is as high as possible in view of downsizing of the unit, and the specific gravity thereof is set to, for example, approximately 8 through 12.

The weight member 18 is fixed at the fixing frame 24 at the face 18C at the tip end side with an adhesive agent, thereby the actuator 10 composed of the weight member 18, connecting member 22, piezoelectric member 12, and driving shaft 14 is supported on the fixing frame 24. The fixing frame 24 is a member mounted onto the main body (not shown) of a mobile telephone and is provided with two through holes 24A and 24A. The through holes 24A and 24A are formed with a slightly greater diameter than that of the driving shaft 14, wherein the driving shaft 14 is slidably supported in the direction of the arrows by inserting the driving shaft 14 into the through holes 24A and 24A.

Figure 2A:
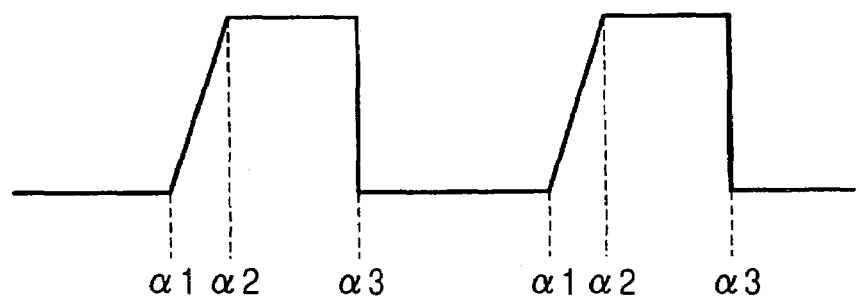
FIGS. 2A and 2B are waveform diagrams showing a driving pulse applied to a piezoelectric element.
Figure 2B:
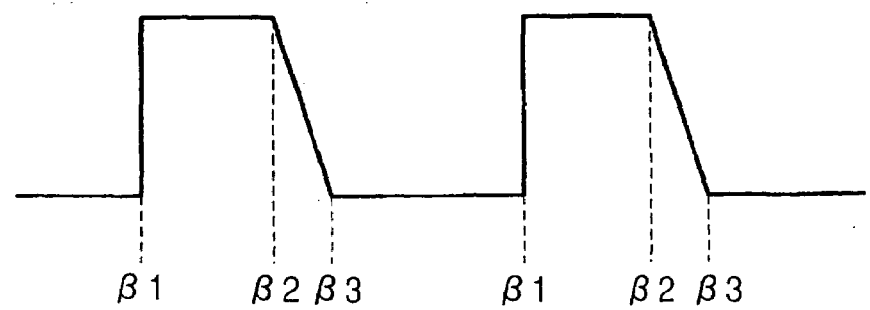

A driving pulse supplying device (not shown) is electrically connected to the above-described piezoelectric element 12, and voltage having such waveforms as shown in FIG. 2A and FIG. 2B is applied by the driving pulse supplying device.

FIG. 2A and FIG. 2B show examples of pulse waveforms applied to the piezoelectric element 12, wherein FIG. 2A shows a pulse waveform for causing the driven member 16 to move in the left direction of the arrows, and FIG. 2B shows a pulse waveform for causing the driven member 16 to move in the right direction of the arrows.

In the case of FIG. 2A, a roughly comb-shaped driving pulse in which a gradual rise occurs from time $\alpha 1$ to time $\alpha 2$, and a rapid fall occurs at time $\alpha 3$ is applied to the piezoelectric element 12. Therefore, the piezoelectric element 12 gently extends from time $\alpha 1$ to time $\alpha 2$. At this time, since the driving shaft 14 gradually moves, the driven member 16 moves along with the driving shaft 14. Accordingly, the driven member 16 can be moved in the left direction in FIG. 1. Since the piezoelectric element 12 rapidly contracts at time $\alpha 3$, the driving shaft 14 moves in the right direction in FIG. 1. At this time, since the driving shaft 14 rapidly moves, only the driving shaft 14 moves with the driven member 16 remaining stopped at its position by inertia. Therefore, by repeatedly applying a comb-shaped driving pulse shown in FIG. 2A, the driven member 16 shown in FIG. 1 repeats moving in the left direction and stopping, wherein it is possible to move the driven member 16 in the left direction.

In the case of FIG. 2B, a roughly comb-shaped driving pulse in which a rapid rise occurs at time $\beta 1$ and a gradual fall occurs from time $\beta 2$ to $\beta 3$ is applied to the piezoelectric element 12. Therefore, the piezoelectric element 12 rapidly extends at time $\beta 1$, wherein the driving shaft 14 moves in the left direction in FIG. 1. At this time, since the driving shaft 14 rapidly moves, only the driving shaft 14 moves with the driven member 16 remaining stopped at its position by inertia. The piezoelectric element 12 gradually contracts from time β2 to time β3. At this time, since the driving shaft 14 is gently displaced, the driven member 16 moves along with the driving shaft 14. The driven member 16 can thus be moved in the right direction in FIG. 1. Therefore, by repeatedly applying the comb-shaped driving pulse shown in FIG. 2B, the driven member 16 shown in FIG. 1 repeats moving in the right direction and stopping, wherein the driven member 16 can be moved in the right direction.

Figure 7A:
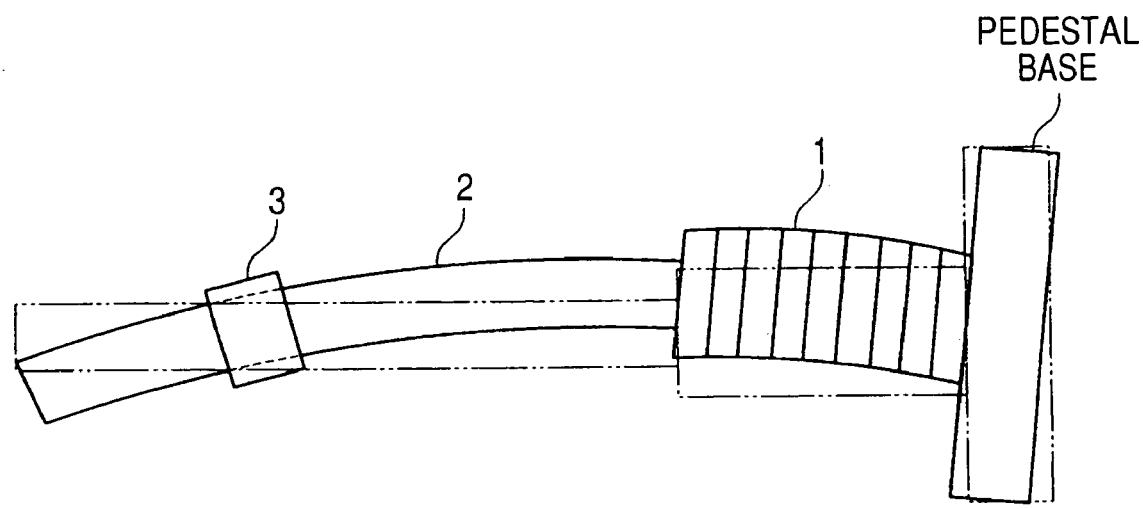
FIGS. 7A and 7B are views describing problematic points of the related-art actuator.
Figure 7B:
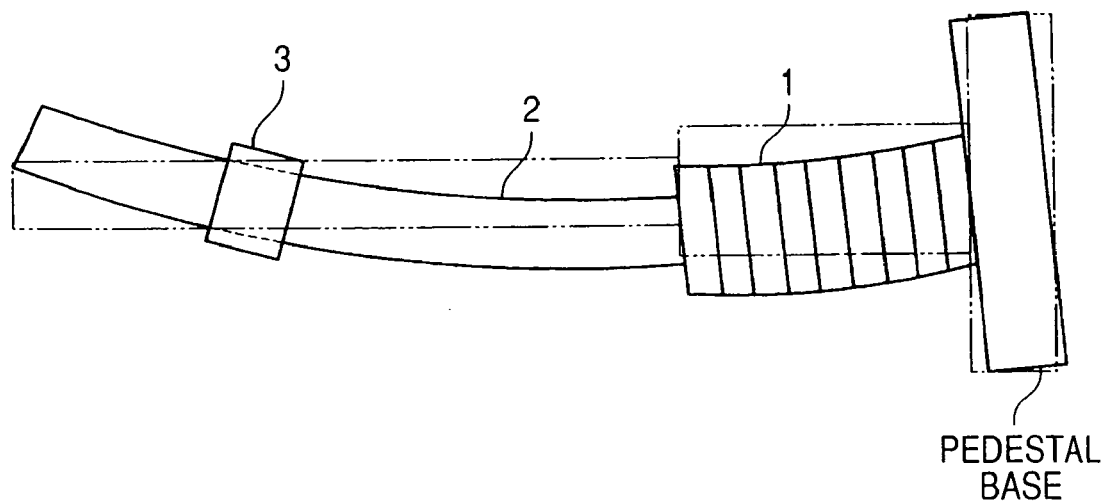

Since, in the actuator 10 according to the embodiment constructed as described above, the weight member 18 is displaced at the end face 12A side from the end face 12B of the piezoelectric element 12, it is possible to downsize the actuator 10 in the driving direction in comparison with the related-art unit shown in FIGS. 7A and 7B (that is, the case where the piezoelectric element 1, driving shaft 2 and pedestal base are arranged in the driving direction).

Further, since the actuator 10 according to the embodiment employs a soft material as the weight member 18, it is possible to suppress resonance generated in the actuator 10 itself. That is, where the weight member 18 composed of a soft material is used, the resonance frequency of the system consisting of the piezoelectric element 12, driving shaft 14, and weight member 18 can be lowered. In detail, it is possible to greatly lower the resonance frequency $f_0$ of the equivalence 1 free system in which the piezoelectric element 12 and the driving shaft 14 are made into mass and the weight member 18 is made into a resilient body. Since the resonance frequency $f_0$ is lowered, the driving frequency f is easily set to a vibration-proof region in which $f \geq 2^{1/2} \cdot f_0$ is brought about, wherein influence of the resonance can be, reduced. Therefore, as shown in FIG. 7A and FIG. 7B, it is possible to prevent vibrations of the piezoelectric element 12 in directions other than the extension/contraction direction, which are generated where the weight member 18 is composed of a hard material. Thereby, since the driving shaft 14 is displaced in the extension/contraction direction of the piezoelectric element 12, a driving force based on extension and contraction of the piezoelectric element 12 can be accurately transmitted to the driven member 16, wherein it is possible to accurately drive and control the driven member 16 in the extension/contraction direction of the piezoelectric element 12. In addition, since the resonance frequency $f_0$ is lowered, influence due to unevenness in the composition of the piezoelectric element 12, driving shaft 14 and weight member 18 is reduced, wherein a stable driving force can be brought about.

Since resonance inside the actuator 10 can be suppressed by thus using the weight member 18 of a soft material, influence of the resonance is reduced where a large weight member 18 is employed, wherein the driven member 16 can be further accurately-moved.

Although the entirety of the weight member 18 is disposed at the end face 12A side from the end face 12B of the piezoelectric element 12 in the above-described embodiment, the position of disposing the weight member 18 is not limited thereto. For example, only a part of the weight member 18 may be disposed at the end face 12A side from the end face 12B.

Figure 3:
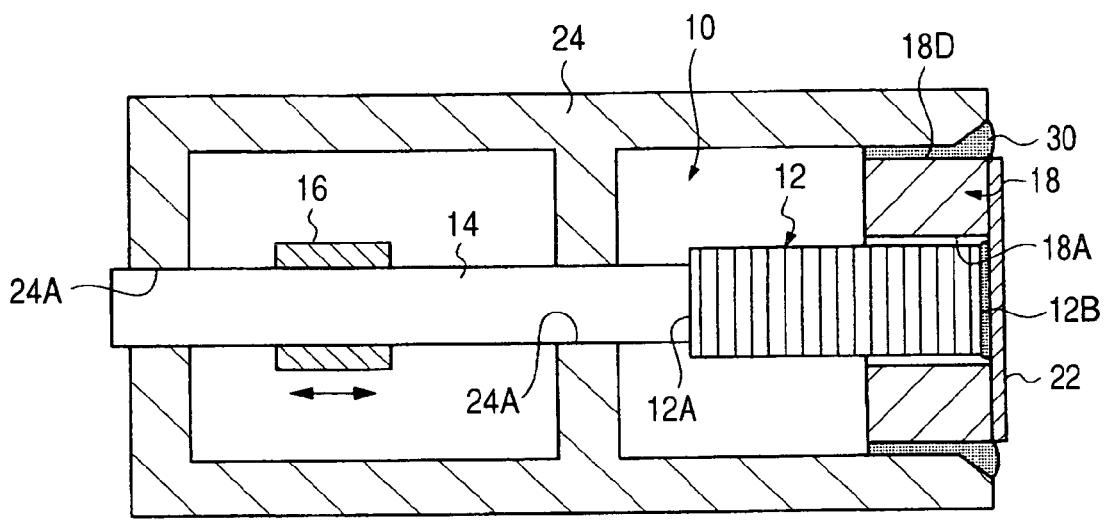
FIG. 3 is a sectional view showing an actuator in which the supporting method differs from that in FIG. 1.

Further, although the weight member 18 is affixed to the fixing frame 24 at the tip end side face 18C in the above-described embodiment, the fixing position thereof is not limited thereto. The weight member 18 may be affixed to the fixing frame 24 at the outside face 18D of the weight member 18 as shown in FIG. 3. In this case, a gap between the outside face 18D of the weight member 18 and the fixing frame 24 may be filled with a resilient adhesive agent 30.

Figure 4:
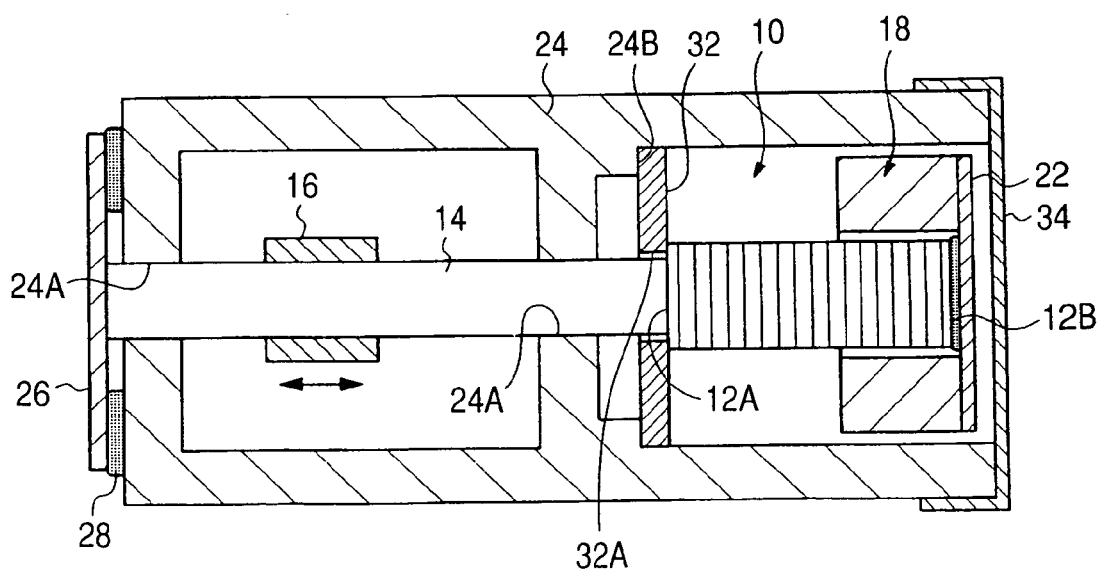
FIG. 4 is a sectional view showing an actuator in which the supporting method differs from that in FIG. 1.

In addition, although the actuator 10 is supported at the weight member 18 side in the above-described embodiment, the supporting method of the actuator 10 is not limited thereto. For example, as shown in FIG. 4, the actuator 10 may be supported at the end face 12A side of the piezoelectric element 12. In the actuator 10 shown in FIG. 4, a supporting member 32 is affixed to the end face 12A of the piezoelectric element 12. A hole 32A is formed in the supporting member 32, and a driving shaft 14 is inserted into the hole 32A. Also, the supporting member 32 is fixed with an adhesive agent in a state that it is brought into contact with the stepped portion 24B of the fixing frame 24.

The actuator 10 supported as described above is supported nearly in a state that it is suspended in midair. Therefore, vibration is hardly transmitted between the actuator 10 and the fixing frame 24, wherein influence due to resonance is reduced, and the driven member 16 can be accurately moved.

Also, a protection plate 26 is mounted onto one side of the fixing frame 24 in FIG. 4 and another protection plate 34 is mounted onto the other side thereof. The protection plate 26 is formed to be like a plate and is mounted onto the fixing frame 24 by a double-sided tape 28 in a state that it is in contact with the tip end face of the driving shaft 14. The protection plate 34 is composed of metal or resin, etc., and is formed to be an overturned U-shape, and it is mounted in a state that it is not in contact with the weight member 18. The actuator 10 is reinforced by attaching the protection plates 26 and 34 to the fixing frame 24, wherein the actuator 10 is prevented from being damaged upon receiving a shock due to a falling object, etc. The protection plate 26 may be mounted without contacting with the driving shaft 14. Also, the protection plate 34 may be mounted in contact with the weight member 18.

Figure 5:
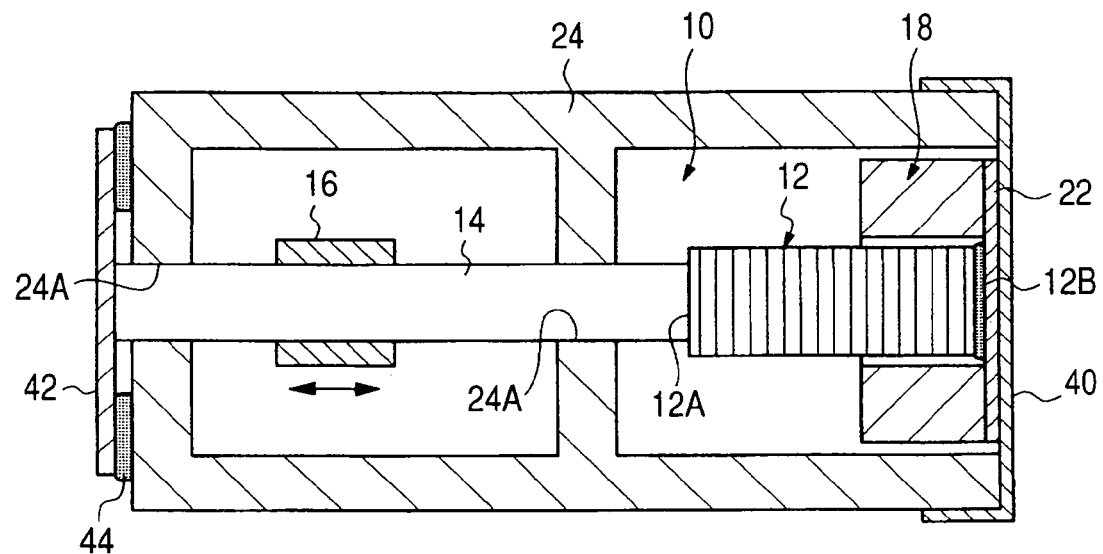
FIG. 5 is a sectional view showing an actuator in which the supporting method differs from that in FIG. 1.

FIG. 5 is a configurational view showing another supporting method of the actuator 10. The actuator 10 shown in FIG. 5 is supported in a state that it is pushed by a pair of supporting plates 40 and 42 at both sides in the extension/contraction direction of the piezoelectric element 12. The supporting plate 40 is composed of a thin metal plate and is formed to be an overturned U-shape, and is mounted onto the fixing frame 24 in a state that it is pushed by the weight member 18. The supporting plate 42 is composed of a thin metal plate and is affixed to the fixing frame 24 by an adhesive agent 44 in a state that the supporting plate presses the tip end face of the driving shaft 14.

If the actuator 10 constructed as described above is supported, the actuator 10 is supported nearly in an internally floated state. The actuator 10 supported in such a state has no portion affixed to the fixing frame 24, vibration is hardly transmitted between the actuator 10 and the fixing frame 24, wherein resonance hardly occurs between the actuator 10 and the fixing frame 24. Therefore, since the actuator 10 is supported so that influence due to resonance is reduced, the driven member 16 can be accurately moved. In particular, where the weight member 18 is composed of a soft material, since resonance is hardly brought about inside the actuator 10 as described above, the actuator 10 can be kept in a resonance-free state by placing the actuator between both sides of the fixing frame 24 and supporting the same therein.

Figure 6:
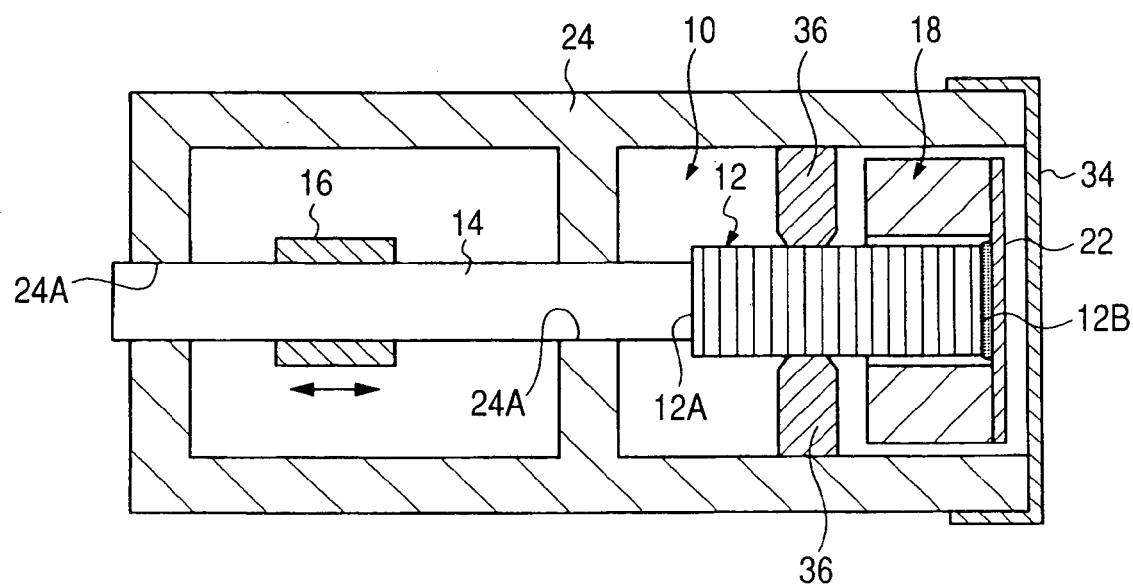
FIG. 6 is a sectional view showing an actuator in which the supporting method differs from that in FIG. 1.

Also, the actuator 10 may be supported as shown in FIG. 6. The actuator 10 in FIG. 6 is supported in a state that both sides of the piezoelectric element 12 are pushed by a pair of supporting members 36 and 36. The supporting members 36 and 36 are made of metal, resin or rubber, etc., and are mounted onto the fixing frame 24. Furthermore, the tip ends of the supporting member 36 and 36 and the sides of the piezoelectric element 12 may be adhered with a resilient adhesive agent. Also, by using a cylindrical member instead of a pair of supporting members 36 and 36, the piezoelectric member 12 may be supported at the entire circumference of the side thereof so as to be pushed.

Since the actuator 10 supported as described above is supported so that both sides of the piezoelectric element 12 are pushed by a pair of supporting members 36 and 36, the actuator 10 is supported nearly in an internally floated state. Therefore, since vibrations are hardly transmitted between the actuator 10 and the fixing frame 24, the actuator 10 is less influenced due to resonance, and it is possible to accurately move the driven member 16.

Although the weight member 18 composed of a soft material is used in the above-described embodiment, the material thereof is not limited thereto. A weight member made of a hard material may be employed. Also in this case, by supporting the actuator 10 as described above, influence due to resonance can be reduced, wherein it is possible to accurately move the driven member 16.

Although the weight member 18 is made into a cylindrical shape in the above-described embodiment, the shape thereof is not limited thereto. The weight material 18 may be divided into a plurality of pieces to be mounted.

Also, the actuator 10 according to the present invention may be applicable to a small-sized precision apparatus such as, for example, a digital camera and a mobile telephone. In particular, although it is necessary that a mobile telephone operates at a low voltage that is 3V or less, it is possible to drive the same at a high frequency, which is 20 kHz or so, if the actuator 10 according to the present actuator is used, and it is possible to move the driven member 16 at a high speed that is 2 mm per second or more. Therefore, even a zoom lens for which movement of 10 mm or so is required can be quickly moved. Also, the use of the actuator 10 according to the present invention is not limited to movement of a movable lens such as a focus lens, zoom lens, etc., and the actuator 10 may also be used for movement of a CCD.

With the actuator according to the present invention, since at least a part of the weight member is disposed inside the end e of an electromechanical conversion element, it is possible downsize the actuator in the driving direction.

The entire disclosure of each and every foreign patent application from which the benefit of foreign priority has been claimed in the present application is incorporated herein by reference, as if fully set forth.

What is claimed is:

1. An actuator comprising:
   an electromechanical conversion element;
   a driving frictional member mounted onto one side in an extension/contraction direction of the electro-mechanical conversion element, the driving frictional member being frictionally engaged with a driven member; and
   a weight member mounted onto the other side in the extension/contraction direction of the electro-mechanical conversion element,
   wherein at least a part of the weight member is disposed at the one side from an end face of the other side of the electro-mechanical conversion element.

2. The actuator according to claim 1, further comprising
   a connecting member mounted onto the end face of the other side of the electro-mechanical conversion element,
   wherein the weight member is mounted onto the connecting member.

3. The actuator according to claim 1,
   wherein the weight member is formed to be cylindrical, and
   at least a part of the electro-mechanical conversion element is disposed inside the weight member.

* * * * *